United States Patent [19]

Roth

[11] Patent Number: 5,011,033
[45] Date of Patent: Apr. 30, 1991

[54] ELECTRICAL SERVICE CENTER

[76] Inventor: Thomas Roth, 91 Powhatan Trail, Medford, N.J. 08055

[21] Appl. No.: 319,663

[22] Filed: Mar. 7, 1989

Related U.S. Application Data

[63] Continuation of Ser. No. 418,785, Sep. 16, 1982, abandoned.

[51] Int. Cl.[5] .............................................. H02B 1/08
[52] U.S. Cl. ................................. 220/3.94; 220/3.8; 220/3.92
[58] Field of Search ...................... 220/3.94, 3.92, 306, 220/3.2, 3.3, 3.5, 3.8

[56] References Cited

U.S. PATENT DOCUMENTS

| | | | |
|---|---|---|---|
| 1,104,366 | 7/1914 | Mahn | 220/306 |
| 1,239,223 | 9/1917 | Ross | 220/306 |
| 1,420,694 | 6/1922 | Gore | 220/3.94 |
| 2,552,400 | 5/1951 | Brunia | 220/3.94 X |
| 2,717,715 | 9/1955 | Whelan | 220/3.94 |
| 2,747,758 | 5/1956 | Appleton | 220/3.92 |
| 2,848,134 | 8/1958 | Carlson | 220/3.94 |
| 4,131,932 | 12/1978 | Brumfield, Jr. et al. | 220/3.8 X |
| 4,517,623 | 5/1985 | Barner et al. | 220/3.8 X |
| 4,715,507 | 12/1987 | Chamberlin | 220/3.94 |

*Primary Examiner*—Steven M. Pollard
*Attorney, Agent, or Firm*—Donald C. Simpson

[57] ABSTRACT

A three-piece electrical box in which the top and bottom can be snapped into place following mounting of the enclosure member, thereby permitting deferral of wire and cable handling until after the principal box member is mounted.

4 Claims, 3 Drawing Sheets

CONVENTIONAL BOX

"B"

STAMP PUNCH

STAMP PUNCH

ELECTRICAL SERVICE CENTER

This Patent Application is a continuation of co-pending Patent application Ser. No. 06/418,785 filed Sept. 16, 1982, now abandoned.

BACKGROUND OF THE INVENTION

In general, electrical power enters a home or building through cabled wires. The main circuits are then divided into separate branch circuits for distribution to different parts of the home or building. Each of the circuits is protected by a fuse or circuit breaker before the circuit leaves the electrical service center. Frequently, there will be a main circuit breaker in the service center located between the inlet cables and the individual branch circuit breakers or fuses. The electrical service center must be compressed into a relatively small space and must be protected from the environment. The various connections and junctions must also be enclosed to protect the building from sparking or other dangers which might create a fire hazard. At the same time, the service center must permit relatively easy access to those persons responsible for maintaining the building, e.g., for the purpose of changing fuses or resetting circuit breakers, without posing a hazard of electrical shock through exposed circuitry.

PRIOR ELECTRICAL SERVICE CENTERS

Until now the typical electrical service center consists of a metal box comprising a back, two vertical sides, and a top and bottom. The front is usually modified to accomodate a front cover which can be screwed to the box and which contains a hinged door for use of those wishing to service circuit breakers or fuses. Either the top or bottom or both parts of the conventional box are provided with scored knock-outs, that is, weakened places that may be pried or hammered out to permit the entrance or exit of cable and wire into the box. These knock-outs are generally of standard size adapted to receive a standard clamp for wires or cables passing into or out of the box which are held in place without substantial movement or chafing. Frequently, particularly in public buildings and apartments, service centers are mounted to a wall stud and sheetrock, plaster, board or other wall covering materials are brought up flush to the box.

For various reasons, it often becomes necessary to add additional circuits or branches to the electrical service center. This entails the removal of the old box and either its replacement or the knocking out of additional knock-outs and the feeding of new wires through and the reinstallation of the box. Where sheetrock or wall coverings define a limited access opening to the box and the cables, the adding of new branch circuits is extremely difficult without cutting out an extremely large hole in the wall covering. The cable clamps must be released after all of the necessary circuit breaker or fuse equipment is removed, the box must be loosened from its fastening to the wall stud or to the wall, and then carefully pulled through the limited opening available in the wall covering. On reinstallation of a new box, the box must again be pushed through the limited opening (enlarged, of course, to accomodate a larger box, but, nevertheless, limited in size to the general dimensions of the electrical service center box). While this box is pushed into the opening, electrical conduits, electrical wires and cables must be fed through the openings and through the clamps in both top and bottom. It should be recognized that these cables are generally of limited length since they are presently in the wall descending from upper levels or rising from lower levels. Thus, while the box is being inserted with a horizontal motion, cables and wires must be fed into the box both top and bottom in a vertical direction. The clamps cannot be tightened to hold these in place until the box is completely inserted into the wall and mounted; thus, there is also danger of losing cables as the box is being put in place.

SUMMARY OF THE INVENTION

In accordance with the present invention, the electrical box consists of a back and two vertical sides. The two vertical sides may wrap slightly around the front to provide vertical lips against which the face plate or cover can be attached. The top and bottom, which are each equipped with knock-outs, are separate from the box, but designed to fit tightly on the top and bottom, respectively, preferably with a snap-lock fit of a type that will be described in more detail subsequently. The box can be placed into the cavity or recess in the wall, mounted to the wall stud or back wall and the wires or cables brought down or upward as the case may be. The top may be placed loosely inside the mounted box, wires led through the knock-outs and the top pushed upwardly until it snaps and locks into place. Similarly, the bottom piece can be placed centrally of the box, any cables or wires needed can be pushed up through the knock-outs and the bottom then pushed downwards into place and snapped. Thus, the entire mounting procedure is simple and quick and saves time and money, not only for the installing electrician but also for the building owner who contracts for the job.

DESCRIPTION OF THE INVENTION

Figure 1:
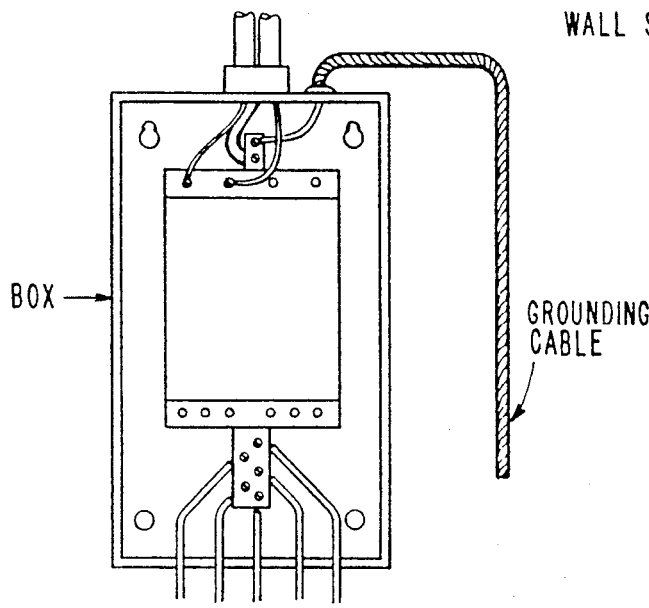
FIG. 1 is a schematic view of a typical electrical service center.
Figure 2:
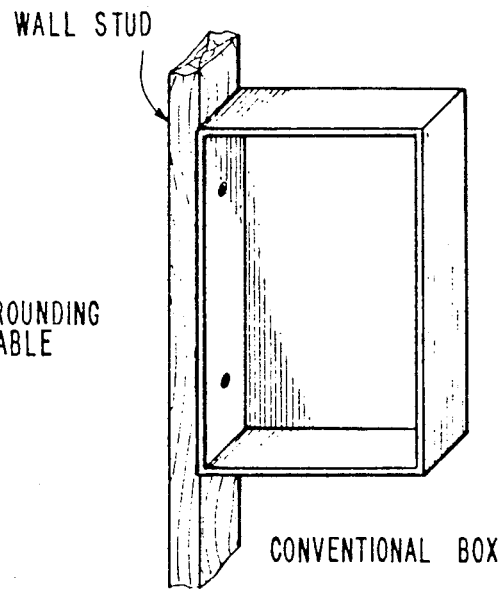
FIG. 2 shows a conventional box mounted to a wall stud.
Figure 3:
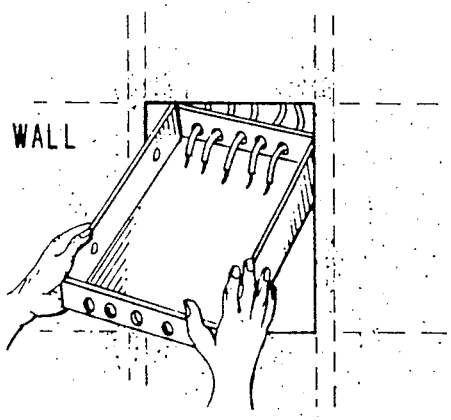
FIG. 3 illustrates the insertion of a conventional box in a pre-existing wall.

FIG. 1 shows a typical electrical service center. Heavy current-carrying cables enter the box and are connected by appropriate electrical connections to fuses or circuit breakers. A number of branch circuits come from that system for feeding the building. In the schematic showing, the front panel and doors are omitted. FIG. 2 illustrates a typical installation in which the box is mounted to a wall stud, cables are fed into the top and bottom to provide the source of electricity and branch circuits. As was described previously, it is common to have wallboard abutt the box. If it then becomes necessary to replace the box for the purpose of additional circuits, the old box must be removed and a new box installed through the opening in the wallboard. As is shown in FIG. 3, the box must be angled inward to accomodate the wires feeding through the top or bottom at the same time. If wires come through both the top and bottom, the task becomes extremely difficult, sometimes requiring that the box be first installed with cables coming down from the top, the box then be pushed upward behind the wallboard to permit cables to be fed up through the bottom as the box is lowered back into place; the new box is then mounted to the wall. The difficulty of this is increased in accordance with the heaviness of the box and the number of wires that must be brought in.

Figure 4:
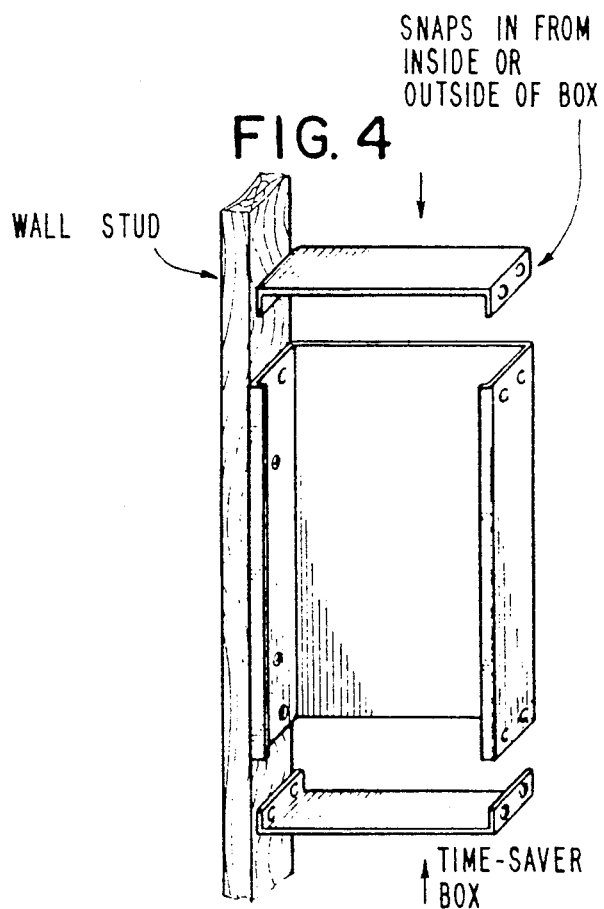
FIG. 4 illustrates schematically the time-saving electrical box of the present invention.
Figure 5:
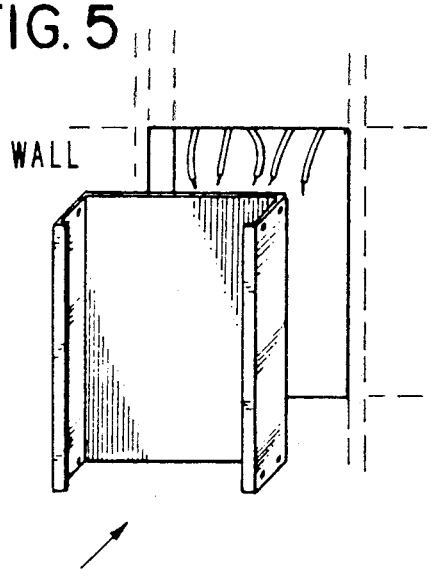
FIG. 5 illustrates the time-saving box being inserted in a slot in the wall.
Figure 6:
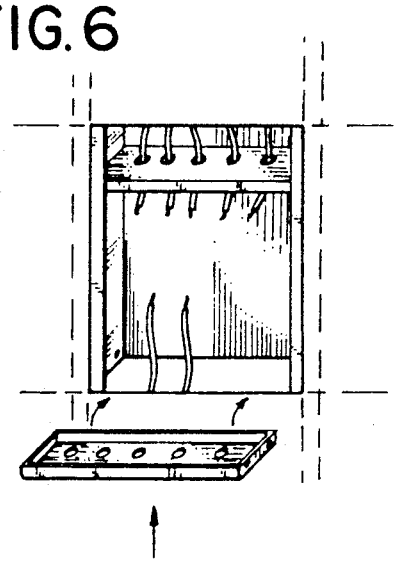
FIG. 6 shows the wires being placed into the top and bottom in the time-saving box.

FIG. 4 illustrates the box of the present invention. The basic part of the box is of U-shaped cross section. The box can be mounted to the wall stud in the usual manner. The difference is that the top and bottom are not snapped in place at the time of mounting to the wall. Thus, as is shown in FIG. 5, the box without top and bottom is slid into the wall directly. Any cables or wires to be placed into the box can be simply placed out of the way for the time or just simply slipped over the top of the box and allowed to hang within the box as the box is pushed back against the building wall. The box can then be mounted in place so that it is no longer necessary to hold it in place. As is shown in FIG. 6, the top or bottom is then placed within the confines of the installed box and the cables or wires are fitted through the knock-outs. The top can then be slid upward into place and the bottom downward into place til they snap and lock in place. The electrician or installer will have his hands free to put each individual wire clamp in place.

While the electrical box of the present invention offers particular utility in the replacement of an old box, it may also be seen that it is of value in new installations because of increased ease of mounting and ease of handling of wires and cables.

Figure 7:
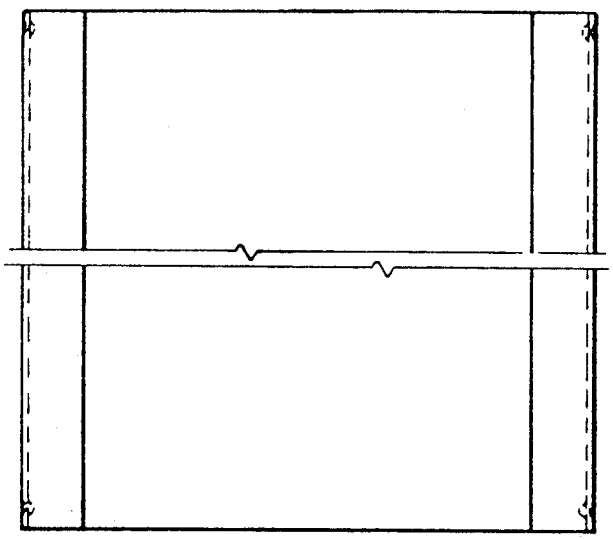
FIG. 7 shows a front elevation of the box of the present invention.
Figure 8:
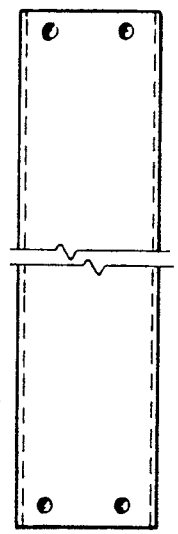
FIG. 8 is a side view.
Figure 9:
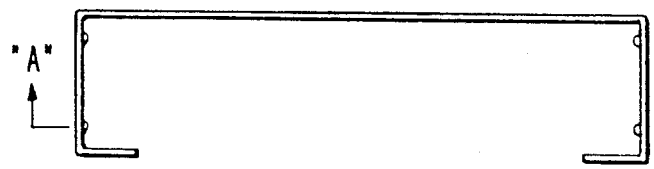
FIG. 9 is the plan view.
Figure 10:
FIG. 10 shows a top view of the top or bottom.
Figure 11:
FIG. 11 shows the elevation view of the cover.
Figure 12:
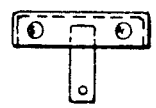
FIG. 12 shows the end view.

The preferred embodiment is shown in FIGS. 7-14. FIGS. 7-9 show the detail of the box with top and bottom removed and with lips formed in front to accomodate a face plate or cover. The box may be made by standard means of bending or it can be made of separate parts and welded as is necessary or appropriate. FIGS. 10-12 show details of a top or bottom for the box. The dimensions of this top or bottom will be just slightly less than those of the box itself so that it is able to slide inside rather than abutt or overlap the box. A ground strap may be provided on side of the top and bottom to insure that the entire box is properly grounded. Suitable knockouts may be scored in the top and bottom to accomodate cable and wire to pass therethrough.

Figure 13:
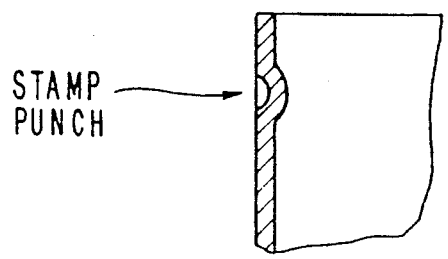
FIG. 13 shows a corresponding snap fitting on the box through section A of FIG. 9.
Figure 14:
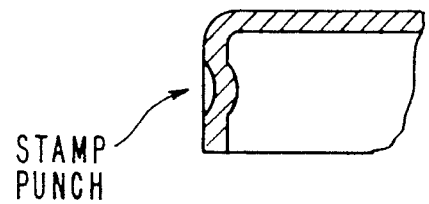
FIG. 14 shows a detail of the snap fitting on the cover through section B of FIG. 10.

FIG. 13 shows a typical "dimple" snap which can be placed in the electrical box as for example section A. FIG. 14 is a similar "dimple" to be provided at section B of the top or bottom. These "dimples" are designed so that when the box tops and box bottoms are put into place, the one shown in FIG. 13 will snap into that in the top of FIG. 14, they will hold the top and the bottom firmly. It has been found generally that four such snaps for each top or bottom member will suffice to hold the top and bottom firmly in place, as is shown in the drawings.

This electrical service center box contains all that is necessary for safety. Compliance with the safeguards normally associated with electrical boxes will result in an installation free from hazard.

The following steps are necessary to remove a conventional electric panel from a pre-existing mounting:

1. Disconnect power source.
2. Take panel cover off.
3. Disconnect and take out all existing breakers and/or fuses.
4. Disconnect all grounds and neutral wires (bare wires and white colored wires).
5. Loosen all locknuts that are connecting wires to panel.
6. Straighten all kinks that may be in the wire (this insures the locknuts to easily come off and will aide in the installation of the new panel).
7. Measure the size of the new panel and cut out the new cavity in the wall to that size.
8. Loosen all the screws on the connectors allowing the wires to move up and down freely.
9. Pull out any nails, screws that may be holding the panel to the studding.
10. Pull out all wires from the connectors.
11. Take out the old panel from the wall. In this procedure it may be necessary to tilt panel or push panel upward or downward to allow panel to be removed.

The foregoing steps take approximately 2½ hours for a qualified electrician. The installation of a new box through that same opening takes at least the same amount of time. This should be compared to the procedure for the installation of the time-saving panel:

1. Install new panel in cavity nailing the panel to the studding through the side holes.
2. Allow the wires to hang free in the panel.
3. Install all needed connectors (clamps) into top (amount connectors so screws are inside panel).
4. Slip all wires through connectors (do not tighten screws of connector to wire at this point).
5. Tilt new top in a downward fashion, insert in top panel snap (if wires are in bottom follow same procedure).
6. Tighten all screws to connectors; hook up all grounds and neutral; and new breakers.

A qualified electrician can perform this job in about 1½ hours. If a time-saving panel had been located in the slot in the first instance, the time for its removal would be approximately one hour.

It can thus be seen that very considerable time is saved utilizing the panel of the present invention.

Having shown and described an exemplary embodiment of the present invention, it will be understood that various modifications and rearrangements of components and elements of construction may be made without departing from the scope of the invention as defined in the appended claims.

What is claimed is:

1. An electrical service box consisting of an enclosure body member comprising a back and two opposing sides, and a plurality of circuit breaker or fuse means mounted to said body means between said sides, said enclosure body member adapted to be mounted to building studs or building walls, a top enclosure member and a bottom enclosure member, each of which is adapted to be mounted in slidable contact with said enclosure body, said top enclosure member and said bottom enclosure member each provided with means of wire or cable openings as the primary access for electrical service into and out of said service box to said circuit breaker or fuse means, said enclosure body and said top and bottom members each provided with means for locking said top member and said bottom member when said top and bottom members are positioned within said enclosure in appropriate top and bottom positions.

2. An electrical service center box in accordance with claim 1 in which said enclosure body is provided with front lip portions affixed to each of said side members adapted for the attachment to said electrical service center of a panel cover.

3. An electrical service center box in accordance with claim 2 in which said locking mechanisms comprise matching dimples in said body, top and bottom members positioned to interlock when said members are assembled in final electrical enclosure position.

4. An electrical service center box in accordance with claim 1 in which said locking mechanisms comprise matching dimples in said body, top and bottom members positioned to interlock when said members are assembled in final electrical enclosure position.

* * * * *